Oct. 21, 1930.  H. M. WOLFE ET AL  1,778,879
METHOD AND MACHINE FOR TWISTING CRANKSHAFTS
Filed March 2, 1927  5 Sheets-Sheet 3

INVENTORS
Henry M Wolfe
Corrington A Nichol
BY
W. W. Harris
ATTORNEY.

Oct. 21, 1930. H. M. WOLFE ET AL 1,778,879
METHOD AND MACHINE FOR TWISTING CRANKSHAFTS
Filed March 2, 1927 5 Sheets-Sheet 4

INVENTORS.
Henry M Wolfe
Corrington A Nichol
BY
C. W. Harris
ATTORNEY.

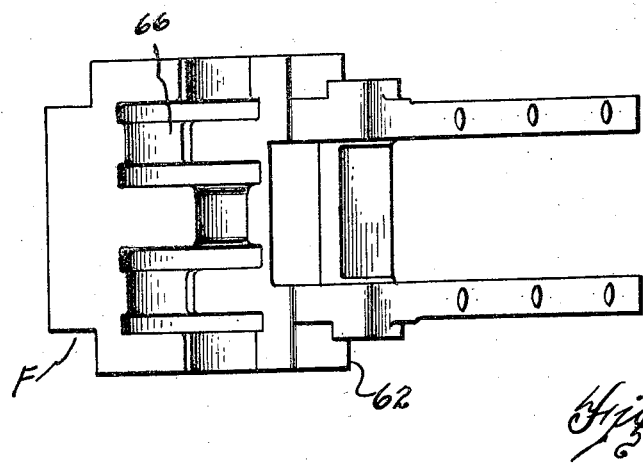
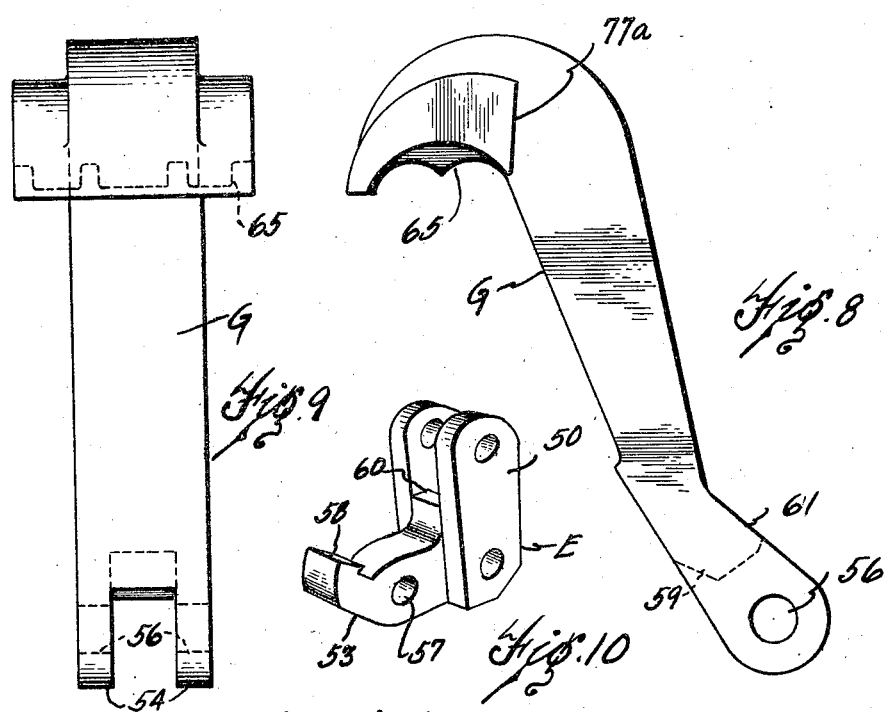
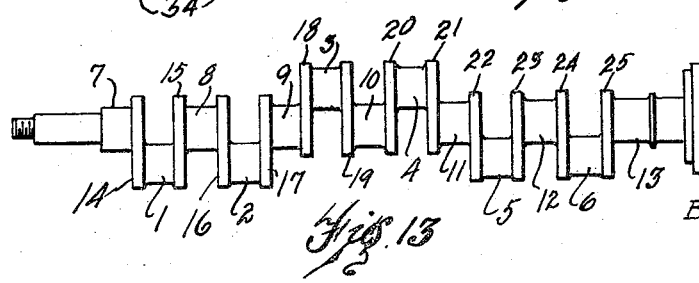

Patented Oct. 21, 1930

1,778,879

UNITED STATES PATENT OFFICE

HENRY M. WOLFE AND CORRINGTON A. NICHOL, OF MUSKEGON, MICHIGAN, ASSIGNORS TO CONTINENTAL MOTORS CORPORATION, OF DETROIT, MICHIGAN, A CORPORATION OF VIRGINIA

METHOD AND MACHINE FOR TWISTING CRANK SHAFTS

Application filed March 2, 1927. Serial No. 171,945.

This invention relates to the metal working art and refers more particularly to a method and machine for use in the manufacture of crankshafts, especially where it is desirable to twist one or more of the crankshaft throws into position.

Among the objects of our invention is the provision of an improved method of manufacturing crankshafts, tending to simplify the steps involved and reduce the ultimate manufacturing cost. A further feature lies in providing a machine for performing a twisting operation on the crankshaft, our machine being comparatively simple in operation and capable of construction at relatively low cost. Our machine may be operated efficiently at low cost and being substantially automatic in its operation requires very little attention on the part of the operator.

One feature of our invention resides in the provision of means whereby a portion of the crankshaft to be twisted, is automatically clamped by the twisting mechanism under remote control, no manual attendance being necessary to operate this portion of the mechanism. We believe this feature as well as other features which will be described hereinafter, to be broadly novel in this art. One convenient embodiment of our invention has been shown in our accompanying drawings in which the operator need only move a control so as to cause the clamping device to automatically clamp a portion of the crankshaft, such portion after the clamping operation, being twisted by the clamping device.

We have illustrated our invention in connection with a seven bearing six throw crankshaft although it will be understood that our method and machine is equally adapted to various types and styles of crankshafts varying in the number of the throws and bearings, formation of the cheeks, counterweighting, and in the particular throws to be twisted.

Further features of our invention reside in the particular arrangements and combinations of the various parts of the machine which tend toward simplicity, efficiency, and economy.

Our method disclosed and described herein is claimed in our copending divisional application Ser. No. 345,294 filed March 8, 1929.

Figure 1:
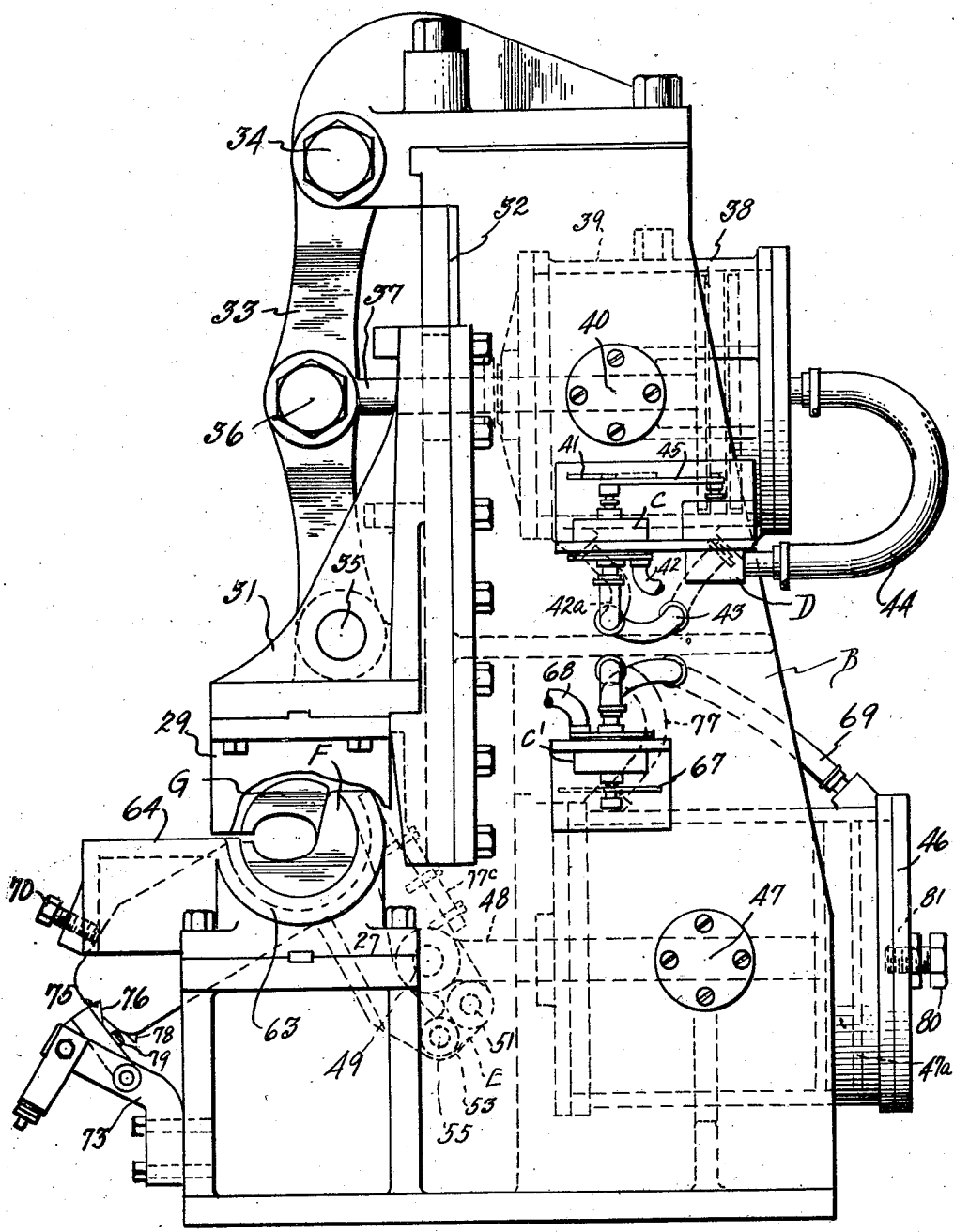
Figure 2:
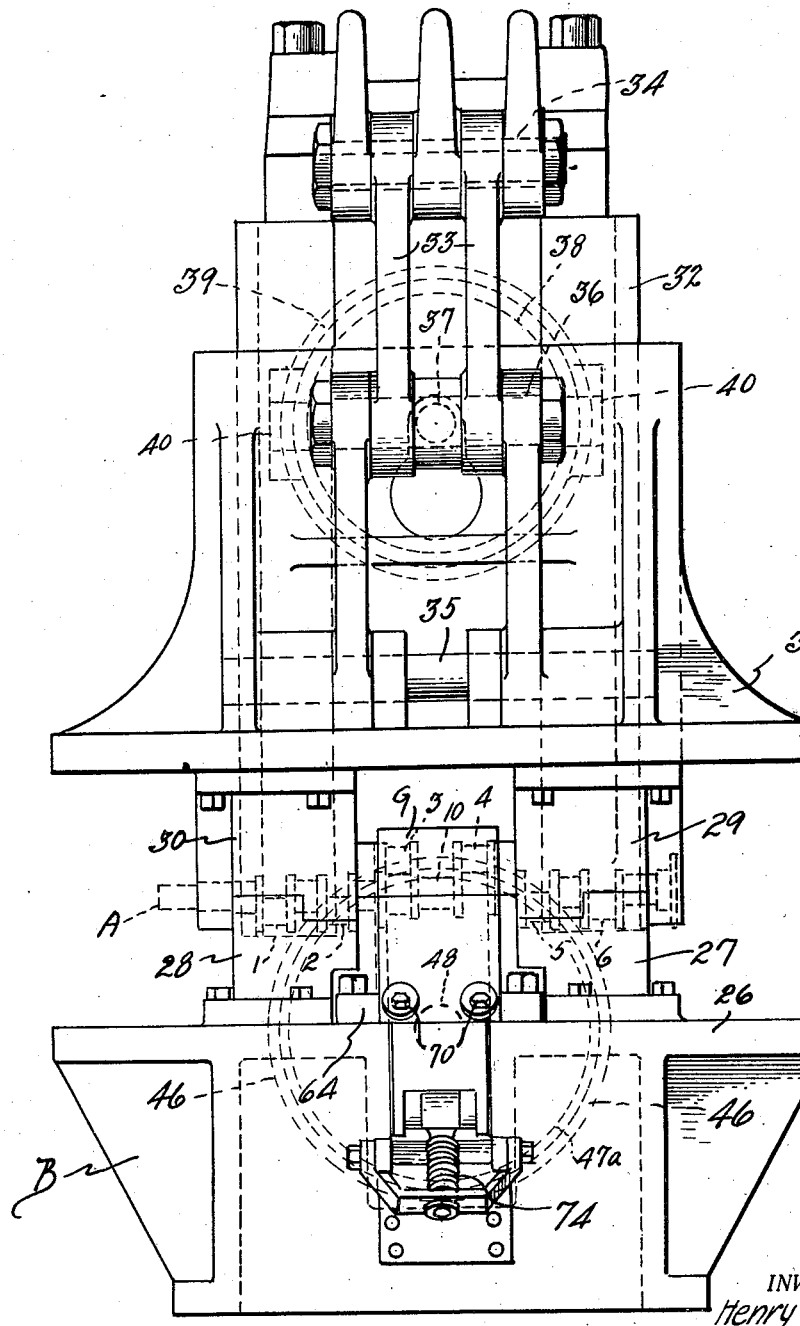
Figure 3:
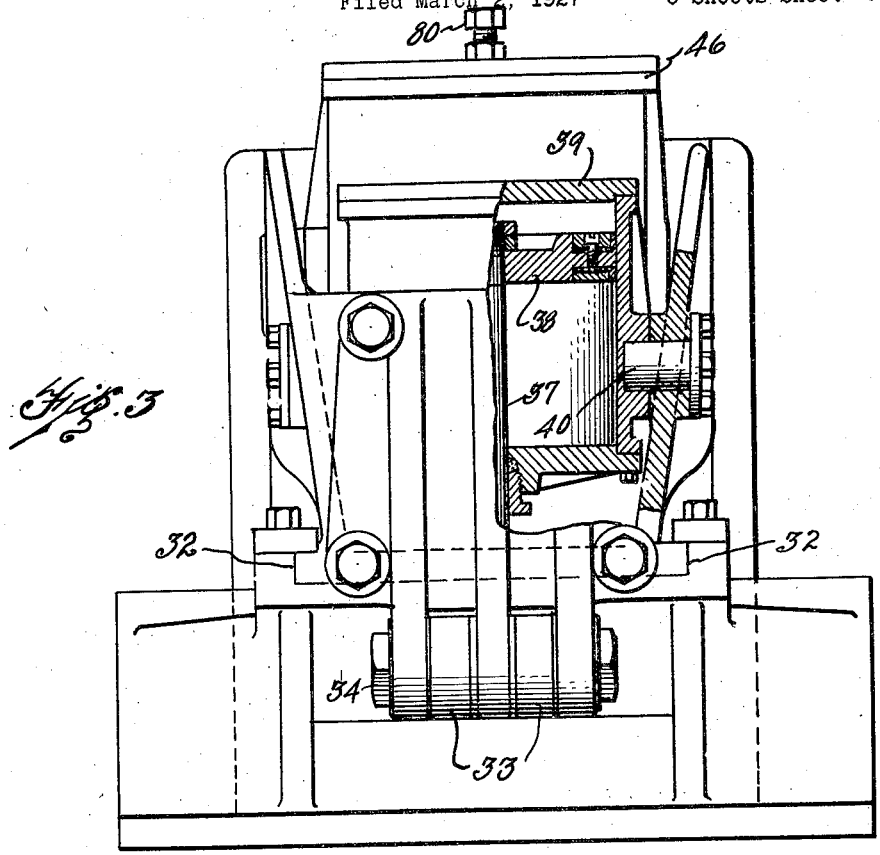
Figures 4, 5:
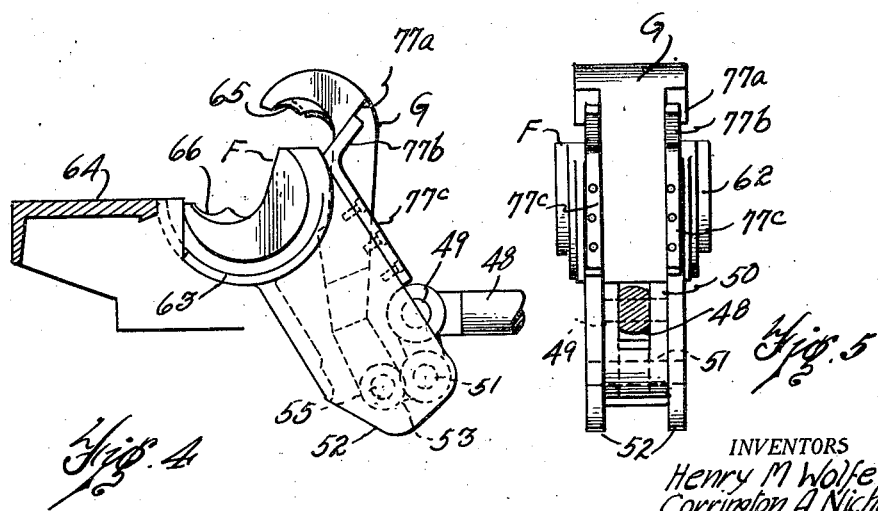
Figure 6:
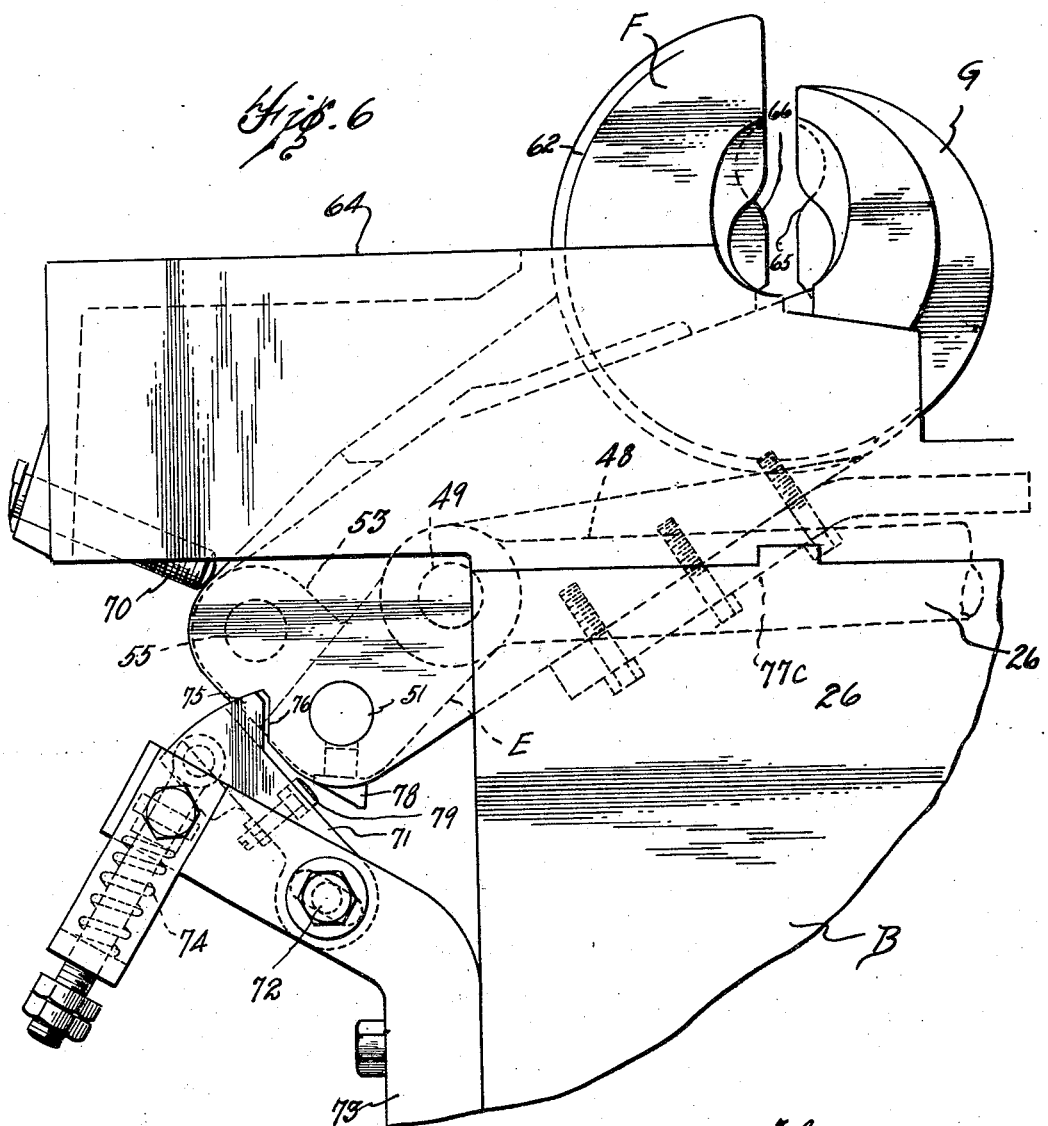
Figure 11:
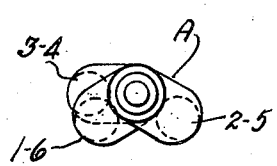
Figure 12:
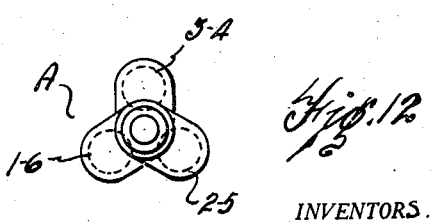

Referring to the accompanying drawings in which like reference characters indicate corresponding parts, Fig. 1 is a side elevation of our machine showing the twisting mechanism in a clamping position about to commence its twisting operation, Fig. 2 is a front elevation of the machine showing the twisting mechanism at the completion of its twisting stroke, Fig. 3 is a plan view of the machine with the cylinder, associated with the crankshaft holding mechanism, partly broken away, Fig. 4 is a detail side elevation of the clamping and twisting mechanism in position to receive a crankshaft, Fig. 5 is a rear elevation of the mechanism shown in Fig. 4, Fig. 6 is an elevation view showing the position of the twisting mechanism at the completion of its movement and further illustrating the latch mechanism associated with this portion of the machine, Fig. 7 is a plan view of one of the twisting elements, Fig. 8 is a side view of the other twisting element, Fig. 9 is a front view thereof, Fig. 10 is a perspective view of the bell crank forming the connection between the twisting elements, Fig. 11 is an end view of the crankshaft before the twisting operation, Fig. 12 is a like view of the completed crankshaft after the twisting operation, and Fig. 13 is a side elevation of the crankshaft shown in Fig. 12.

In carrying out our invention we prefer to first forge in one or more operations certain of the crank throws into their final positions, simultaneously fashioning all of the throws, cheeks, and bearings with certain of the throws in a position to be twisted.

Crankshafts in general may ordinarily be completely forged in position but a saving in die cost and machining operations, as well as other advantages, is brought about by our invention. In the instance of the particular crankshaft illustrated reference character A represents the shaft having the throws 1–6 inclusive, bearings 7–13 inclusive, and cheeks 14–25 inclusive. The throws in this type of crankshaft are ordinarily arranged as shown in Figs. 12 and 13, the pairs of throws indicated being 120° apart. In Fig. 11 we have shown the crankshaft with our preferred arrangement of throws forged in position as will readily be understood. Thus the crankshaft before operation of the twisting machine has the throws 1, 6, 2, 5 forged in their ultimate respective positions, the throws 3, 4 being fashioned during the forging operation preferably substantially 90° from their ultimate positions as shown in Figs. 12 and 13. If desired, these throws 3, 4 might be forged in other positions, for ultimate swinging or twisting, but we prefer to locate these throws as indicated.

In producing the forging shown in Fig. 11 the stock might be first cut to desired length, heated suitably for working, subjected to an edger operation to roughly fashion the crankshaft throws in a single plane, all of these steps being well known in the art. The forging might then be subjected to forging dies to produce the crankshaft shown in Fig. 11. This forging might then be trimmed to remove the excess metal at the die parting line and then restruck to remove excess draft to facilitate machining although this latter step is not deemed necessary for a successful production of crankshafts. The crankshaft is then subjected to the twisting operation by our machine whereby throws 3, 4 are swung into their proper relative positions shown in Figs. 12 and 13. The crankshaft may then be restruck in the well known manner to further insure proper alignment of the various elements of the crankshaft. We have found however that our twisting machine operates to such a degree of accuracy that the restriking operation might well be dispensed with, such operation being desirable from a standpoint of further insuring that the shaft is in alignment. The entire method as outlined may be accomplished in one heating of the metal, our twisting machine being capable of speedily receiving, twisting, and discharging the crankshaft.

We will now describe our improved twisting machine in detail. This machine comprises a main casting B having a bed 26 receiving lower fixed holding elements 27, 28 respectively cooperating with upper relatively movable holding elements 29, 30. These pairs of holding elements are preferably formed with suitable recesses and projections conforming with the surface contour of the end pairs of throws with associated cheeks and bearings whereby upon downward movement of the upper holding elements the crankshaft is firmly held with the center throws 3, 4 exposed for twisting preferably as a unit about bearings 9 and 11.

For controlling the movement of the holding elements 29 and 30 any suitable mechanism might be provided. For example, we have provided a head 31 slidable vertically on guides 32, the head carrying the movable holding elements and actuated by a toggle linkage 33. The levers of the toggle 33 are respectively pivoted at their ends 34, 35 to the frame B and slide 31, the central pivot 36 being actuated by a piston rod 37 connected with piston 38 operating in cylinder 39 supported on pivotal bearings 40 to compensate for the angular travel of the pivot point 36 about the point of swinging 34. When it is desired to hold the crankshaft in position for a twisting operation, fluid under pressure, conveniently air, is admitted from supply pipe 42 to the forward side of piston 38, the air being controlled in any suitable manner such as by a two way valve C of ordinary suitable commercial design. Thus by moving valve handle 41, air passes from the valve to the pipe 42ª leading to the inside of the cylinder to the forward side of the piston. Simultaneously, the movement of handle 41 serves to exhaust any fluid behind the piston by way of exhaust pipe 43. The pipes 42 and 43 also function respectively as exhaust and inlet pipes upon proper actuation of the handle 41, a suitable vent being provided for the exhausted air at the valve C or other convenient point. The details of the valve are not important since any well known suitable valve might be used. In order to hasten the movement of the piston 38 we have provided an auxiliary exhaust pipe 44 controlled by a valve D suitably operated at the proper time from handle 41 as by a link 45.

A second air cylinder 46 is provided, likewise pivoted at 47 to afford a pivotal movement about a horizontal axis. Within this cylinder is located an operating piston 47ª which may be similar in construction with the piston 38. This piston actuates the piston rod 48 pivoted by a pin 49 between the forked end 50 of bell crank lever E, the latter being pivoted by a pin 51 carried between the arms 52 of the clamping twisting element or base F. The other end 53 of bell crank E operates between the forks 54 of the complementary clamping twisting element or cap G, a pin 55 establishing pivotal connection of these parts by reason of pin bearings 56 and 57. The end 53 has a face 58 engageable with a face 59 of element G in one direction of rocking of the bell crank and like cooperating faces 60 and 61 are provided for engagement in the other direction of rocking of the bell crank. The complementary clamping twisting elements F and G together provide a twisting block.

The element F is formed with flanges or trunnions 62 having a rotatable bearing 63 in a block 64 fixed with respect to the bed of the machine. The element G has a clamping twisting face 65 for overlying and cooperating with the clamping twisting face 66, these faces, like the holding elements 27, 29, together conforming with the surface contour of the crankshaft so as to cooperate to enclose the portion of the crank shaft to be twisted.

With the parts in the position shown in Fig. 4 the forged crankshaft, ready for the twisting operation, may be placed in the machine, the faces of the holding members 27, 28 and clamping twisting element F providing for nesting of the crankshaft therein, as will be readily understood. It will be noted that the element G is located clear from interference with placement of the crankshaft. The lever 41 is actuated to produce a lowering of the head 31 whereby the crankshaft ends are firmly gripped.

Air is then introduced at the rear of cylinder 46 by movement of hand lever 67 acting through a valve C' to admit air from supply line 68 to outlet 69. The first part of the movement of piston rod 48 to the left (as shown in Figs. 1 and 4) swings the bell crank E counterclockwise on its pivot 51 swinging element G into the position shown in Fig. 1, without movement of the element F which offers greater resistance to movement because of engagement by the crankshaft. As soon, however, as the element G has been swung to engage the crankshaft, this relative position of the twisting clamping elements being shown in Fig. 1, continued movement of the piston rod 48 will swing the elements F, G, clockwise within bearing 63, through an arc of 90° twisting and positioning the throws 3, 4 in a position 120° from the other throws as shown in Figs. 2, 12 and 13.

In order to accurately limit the angular twisting movement of the crankshaft twisting elements so as to accurately twist the throws through the exact desired angle, we have provided one or more adjustable stops 70 engageable with the element F. Before rotating the twisting elements back to the initial position it is desirable to arrange the return movement of the actuating piston so as to first hold element F fixed until element G is moved free from the crankshaft, whereupon both clamping elements may be rotated free from engagement with the twisted crankshaft. To this end a latch 71 is pivoted at 72 to a fixed bracket 73, the latch being urged upwardly by spring 74 so as to automatically engage the latch nose 75 in a recess 76 in the lower end of one or both of the arms 52 of twisting element F.

When the twisting operation is completed, the lever 67 is actuated to exhaust the cylinder through pipe 69 and simultaneously admit air to the opposite end of the cylinder through the pipe 77, which pipe 77 also serves as an exhaust pipe when air is admitted to the opposite end of the cylinder. Thus the piston rod 48 will be moved to the right or rearwardly, the initial portion of the return stroke swinging bell crank E clockwise about its pivot 51 whereby the clamping element G will be swung entirely clear of the crankshaft into a position relative to the element F as shown in Fig. 4, although it will be understood that in this figure the end of the return stroke has been reached. This swinging movement of element G may be limited by engagement of shoulders 77$^a$ on the arms 77$^b$ of the angle stops 77$^c$ secured along the edges of arms 52 of element F as best shown in Figs. 4 and 5. This initial portion of the return stroke, after latch 71 has held element F stationary while element G has swung clear of the crankshaft, moves a trip 78, carried by the bell crank E, into contact with the lug 79 whereby, when the element G has cleared the crankshaft, the latch 71 will be tripped against the action of spring 74, moving the nose 75 clear of the recess 76. Continued movement of the piston rod will then swing the elements F and G counterclockwise into the position shown in Fig. 4 ready to receive another crankshaft. 80 represents a stop, preferably adjustable, having an end 81 within the cylinder for limiting the rearward movement of the piston within cylinder 46. During this return movement, the throws 3, 4 having been twisted upwardly, the clamping twisting elements return entirely clear of the crankshaft, which is still preferably held by the end holding elements.

The holding elements may then be released from engagement with the crank shaft by suitably moving the valve lever 41 to cause piston 38 to move slide 31 upwardly. The twisted crankshaft may then be removed from the machine and subjected to a restriking operation, if desired. Throughout the entire method of operations the crankshaft bearings are preferably aligned at all times.

It will thus be noted that we have provided a novel method of forming crankshafts. Our machine for performing the twisting operation is simply constructed and is especially adapted for quickly and accurately twisting the desired throws. If desired other power means may be arranged for causing movement of the holding and clamping elements and the scope of our invention is not intended to be limited to the specific showing of these and other features of our invention. Among the features of novelty of our machine is the manner in which we effect an automatic clamping of one or more of the throws without requiring an attendant to manually apply or lock the clamping mechanism. Furthermore by simply operating the power control, our machine automatically applies the twisting clamp and then produces the twisting operation. Another feature of novelty resides in the latch mechanism which is automatically responsive to movement of the twisting mechanism.

Our machine and method may be conveniently adapted to many other styles of crankshafts than the particular style illustrated. It is to be understood that the holding and twisting elements are provided with faces fashioned like dies to correspond to the contour of the crankshaft to be twisted; also it may be found desirable to twist other of the throws into final position. Certain features of our machine could be incorporated to advantage where a plurality of twisting units are employed, each of which could be caused to automatically clamp and twist the desired portions of the crankshaft. Our invention is applicable to crankshafts having a plurality of throws and wherein it is desired to ultimately fashion and position the throws at a relatively angular position. Thus the various throws might be forged in a common plane with certain of the throws out of the ultimate desired position and finally twisted into proper relation by one or more pairs of our twisting clamping elements.

What we claim as our invention is:

1. A crankshaft twisting machine comprising holding means for a crankshaft, twisting means for rotating a throw of the crankshaft about the axis of the crank shaft including a twisting element, power means for actuating said twisting means, and a latch mechanism engageable with said twisting means in the final twisting position thereof to releasably hold the twisting mechanism in a predetermined position.

2. A crankshaft twisting machine comprising holding means for a crankshaft, twisting means for rotating a throw of the crankshaft about the axis of the crankshaft including a twisting element, power means for actuating said twisting means, a latch mechanism engageable with said twisting means in the final twisting position thereof to releasably hold the twisting mechanism in a predetermined position, and means responsive to a return movement of said twisting mechanism from the final twisting position toward the initial position for disengaging said latch mechanism.

3. A crankshaft twisting machine comprising holding means for a crankshaft and twisting means for angularly swinging a throw of said crankshaft said means including a rotatable clamping twisting element, a cooperating clamping twisting element, power means adapted to swing one of said elements toward the other to clamp the said throw and to rotate said elements together as a unit to twist said throw, latch mechanism for engaging the first element at the completion of the twisting operation, and means responsive to a predetermined swinging movement of the second element away from the first to effect release of said latch mechanism.

4. Crankshaft twisting mechanism including a first element, a second element, connecting means for said elements permitting their combined rotation, relative movement toward or from each other, power means, means connecting the power means and said mechanism to rotate said elements together in opposite directions, said power means when acting in one direction serving to first move said elements relatively toward each other and then to rotate said elements together, and latch mechanism engageable with the twisting mechanism after a predetermined angular movement of said elements.

5. Crankshaft twisting mechanism including a first element, a second element, connecting means for said elements permitting their combined rotation and relative movement toward or from each other, power means, means connecting the power means and said mechanism to rotate said elements together in opposite directions, said power means when acting in one direction serving to first move said elements relatively toward each other and then to rotate said elements together, said power means when acting in the opposite direction serving to first move said elements relatively from each other and then to rotate said elements, and latch mechanism for releasably holding the twisting mechanism after a predetermined rotation of said elements in the direction first aforesaid.

6. Crankshaft twisting mechanism including a first element, a second element, connecting means for said elements permitting their combined rotation and relative movement toward or from each other, power means, means connecting the power means and said mechanism to rotate said elements together in opposite directions, said power means when acting in one direction serving to first move said elements relatively toward each other and then to rotate said elements together, said power means when acting in the opposite direction serving to first move said elements relatively from each other and then to rotate said elements, latch mechanism for releasably holding the twisting mechanism after a predetermined rotation of said elements in the direction first aforesaid, and means responsive to a predetermined movement of said elements from each other for disengaging said latch from the twisting mechanism.

In testimony whereof, we affix our signatures.

HENRY M. WOLFE.
CORRINGTON A. NICHOL.